United States Patent [19]
Cohrs et al.

[11] Patent Number: 4,794,785
[45] Date of Patent: Jan. 3, 1989

[54] APPARATUS FOR DETERMINING THE CHARACTERISTIC OF A FLOWMETER

[75] Inventors: Gary D. Cohrs, Tempe; Ronald J. Jackson, Phoenix; Edward E. Francisco, Jr., Paradise Valley, all of Ariz.

[73] Assignee: Flow Technology, Inc., Phoenix, Ariz.

[21] Appl. No.: 898,763

[22] Filed: Aug. 14, 1986

Related U.S. Application Data

[63] Continuation-in-part of Ser. No. 644,650, Aug. 27, 1984, abandoned, which is a continuation of Ser. No. 287,187, Jul. 27, 1981, abandoned, and a continuation-in-part of Ser. No. 644,651, Aug. 27, 1984, abandoned, which is a continuation of Ser. No. 288,338, Jul. 30, 1981, abandoned.

[51] Int. Cl.$^4$ .............................................. G01F 25/00
[52] U.S. Cl. ........................................................ 73/3
[58] Field of Search ................................ 73/3, 47, 168; 15/104.06 B

[56] References Cited

U.S. PATENT DOCUMENTS

| | | | |
|---|---|---|---|
| 3,098,382 | 7/1963 | Hoffman et al. | 73/168 |
| 3,403,544 | 10/1968 | Francisco, Jr. | 15/104.06 B |
| 3,492,856 | 2/1970 | Francisco, Jr. | 73/3 |
| 3,768,510 | 10/1973 | Reves | 73/3 |
| 3,877,287 | 4/1975 | Duntz, Jr. | 73/3 |
| 4,152,922 | 5/1979 | Francisco, Jr. | 73/47 |
| 4,307,601 | 12/1981 | Jackson | 73/3 |
| 4,372,147 | 2/1983 | Waugh et al. | 73/3 |
| 4,627,267 | 12/1986 | Cohrs et al. | 73/3 |
| 4,628,724 | 12/1986 | Maurer | 73/3 |
| 4,637,244 | 11/1983 | Maurer et al. | 73/3 |

*Primary Examiner*—Tom Noland
*Attorney, Agent, or Firm*—Christie, Parker & Hale

[57] ABSTRACT

A fluid displacement measuring cylinder has near its ends, respectively, an inlet and an outlet. A fluid displacement measuring piston is adapted to travel through the measuring cylinder as a fluid barrier. A control piston having first and second sides is adapted to travel through the control cylinder as a fluid barrier. A rod connects the control piston only to the side of the measuring piston facing toward one end of the measuring cylinder. A gas pressurized plenum chamber is connected to the control cylinder so the force of the gas pressure urges the measuring piston toward the other end of the measuring cylinder. The movement of the measuring piston through the measuring cylinder is sensed and the movement of the control piston through the control cylinder is fluidically controlled. The pressure in the plenum chamber, which has a substantially larger volume than the control cylinder, is selected so as to cancel the force imbalance caused by the rod.

34 Claims, 2 Drawing Sheets

APPARATUS FOR DETERMINING THE CHARACTERISTIC OF A FLOWMETER

CROSS-REFERENCE TO RELATED APPLICATIONS

This application is a file-wrapper continuation-in-part application of application Ser. No. 644,650 filed on Aug. 27, 1984 abandoned, which is a continuation of application Ser. No. 287,187 filed on July 27, 1981, abandoned, and a continuation-in-part of application Ser. No. 644,651 filed on Aug. 27, 1984, abandoned, which is a continuation of application Ser. No. 288,338 filed on July 30, 1981, abandoned. This application claims the benefit of the filing dates of all the cross-referenced applications under 35 U.S.C. §120. All of the cross-reference applications are also incorporated fully herein by reference.

BACKGROUND OF THE INVENTION

This invention relates to the measurement of fluid flow and, more particularly, to apparatus for determining the characteristic of a flowmeter.

U.S. Pat. No. 4,152,922 which issued May 8, 1979, to Edward E. Francisco, Jr., discloses a ballistics flow prover in which a measuring piston adapted to travel through a measuring cylinder is connected by a rod to a control piston adapted to travel through a control cylinder. The measuring cylinder is connected in a fluid line in series with a flowmeter whose characteristic is to be determined. A source of pressurized air is connected to the control cylinder so the force of the air pressure acts alternatively on both sides of the control piston. The air pressure is regulated to control movement of the control piston through the control cylinder during operation of the prover.

The connection of the rod to only one side of the measuring piston reduces the area to which fluid can be exposed on one side of the measuring piston, vis-a-vis, the other side. This creates on the measuring piston an undesirable force imbalance that impedes its movement during a test run. Impeding movement of the measuring piston affects, i.e., changes, the flow rate and sets up transient pressure disturbances in the fluid flowing through the line in which the measuring cylinder is connected. To eliminate such a pressure differential, one embodiment of the prover disclosed in U.S. Pat. No. 4,152,922 employs a rod that is connected to both sides of the measuring piston and extends all the way through the measuring piston from end to end. As a result of the additional length of rod extending out of the end of the measuring cylinder opposite the control cylinder, the apparatus occupies substantially more space.

SUMMARY OF THE INVENTION

According to the invention, an approximately constant force is exerted on one side of a control piston equal and opposite to the force imbalance on the measuring piston in apparatus for determining the characteristic of a flowmeter. Specifically, a fluid displacement measuring cylinder has near its ends, respectively, an inlet and an outlet. A fluid displacement measuring piston is adapted to travel through the measuring cylinder as a fluid barrier. A control piston having first and second sides is adapted to travel through the control cylinder as a fluid barrier. A rod connects the control piston only to the side of the measuring piston facing toward one end of the measuring cylinder. Preferably, the constant force is exerted on the control piston by a gas pressurized plenum chamber connected to the control cylinder so the force of the gas pressure urges the measuring piston toward the other end of the measuring cylinder. The movement of the measuring piston through the measuring cylinder is sensed and the movement of the control piston through the control cylinder is fluidically controlled. The pressure in the plenum chamber, which has a substantially larger volume than the control cylinder, is selected so as to cancel the force imbalance caused by the rod. In addition, it also preferably cancels the dynamic frictional force exerted on the measuring piston as it travels through the measuring cylinder. Thus, it is not necessary for the rod to extend through the measuring cylinder fromend to end and protrude from the end of the measuring cylinder opposite the control cylinder to eliminate the effect of piston travel on the flow through the fluid line.

A feature of the invention is the use of gas on one side of the control piston and liquid on the other side of the control piston to operate the prover. As described above, the gas is supplied to one side of the control piston from a pressurized plenum chamber. Liquid is applied to the other side of the control piston by means of a hydraulic pump. The pressure of the liquid is varied to control the movement of the control piston. The described arrangement imposes smaller power requirements on the pump than an arrangement in which liquid is applied to both sides of the control piston and requires no air compressor as an arrangement in which air is applied to both sides of the control piston. This feature of the invention is applicable to calibrators as well as provers.

According to another feature of the invention, a servo valve controls the application of liquid from the pump to the control cylinder in response to the pressure in the system so as to suppress flow disturbances in the fluid line in which the prover and a flow meter are connected.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
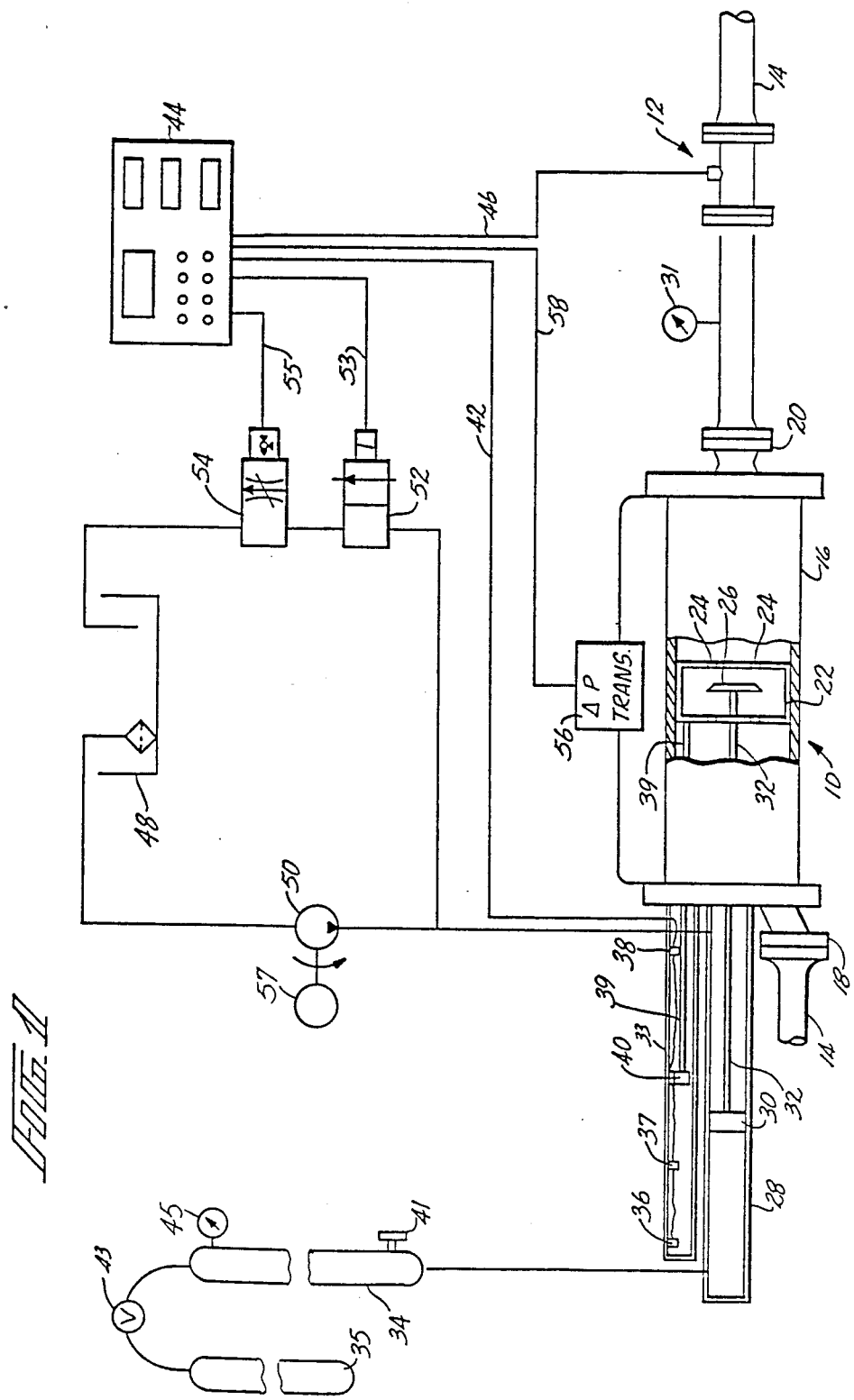
FIG. 1 is a schematic diagram of a prover incorporating the principles of the invention.

In FIG. 1, a prover 10 is connected in series with a flowmeter 12 under test in a fluid line 14. Prover 10 includes a measuring cylinder 16 with an inlet 18 and an outlet 20 connected to line 14. A measuring piston 22 is adapted to travel through cylinder 16 as a fluid barrier. A plurality of openings 24 are formed in piston 22 to permit flow of fluid from line 14 through cylinder 16 when piston 22 is at rest. A poppet valve 26 is adapted to move toward and away from openings 24 to close and open the passage therethrough. A control cylinder 28 abuts the inlet end of cylinder 16 in axial alignment therewith. A control piston 30 is adapted to travel through cylinder 28. Poppet valve 26, and thus measuring piston 22, is coupled to control piston 30 by a rod 32.

Rod 32 is only connected to the upstream side of piston 22 and the side of control piston 30 facing toward it. Reference is made to U.S. Pat. No. 4,152,922, the disclosure of which is incorporated fully herein by reference, for a description of the specific construction of the described elements of prover 10, including the seals and bushings thereof, as well as the elements described hereinafter.

Poppet valve 26 can be considered to be part of piston 22 insofar as the pressure forces exerted thereon by the fluid line 14 are concerned. As a result of the connection of rod 32 only to the upstream side of poppet valve 26, the area of the upstream side of piston 22 against which the fluid in line 14 acts is smaller than the area of the downstream side of piston 22 against which the fluid in line 14 acts. This creates a force imbalance urging piston 22 toward the upstream end of cylinder 16, thereby impeding travel of piston 22 from the upstream end of cylinder 16 to the downstream end thereof. Dynamic friction exerted on piston 22 as it moves through cylinder 16 also impedes its travel. Impeding measuring piston travel effects, i.e., changes, the flow rate and sets up transient pressure disturbances in the fluid flowing through line 14. To compensate for and cancel the force imbalance and frictional force, a plenum chamber 34 is connected to the end of control cylinder 28, opposite measuring cylinder 16. Plenum chamber 34 is charged with pressurized gas from a gas source 35, the pressure of the gas in plenum chamber 34 preferably being selected at an optimum value to exert on the side of piston 30 facing away from piston 22 a force equal and opposite to the force imbalance on piston 22 due to rod 32 plus the dynamic friction of piston 30 moving through cylinder 16, caused by seals, bushings, etc. The optimum value of plenum gas pressure is determined by comparing the flowmeter response when piston 30 is in its standby, i.e., upstream, position with the flowmeter response when piston 30 is moving through cylinder 16. The plenum gas pressure is adjusted until the two responses are the same, which indicates that piston 30 is not impeding flow through the line while piston 30 is moving through cylinder 16. The optimum value of the pressure in plenum chamber 34 varies as a function of the static fluid pressure in line 14. For precise measurements, the above procedure should be carried out before each run or the static pressure could be measured before a test run, for example by a pressure probe 31 in line 14 and the pressure in plenum chamber 34 then adjusted accordingly to the optimum value. To this end, source 35 is connected to plenum chamber 34 through a manual control valve 43 and plenum chamber 34 has a pressure gauge 45 and a venting value 41. The pressure of source 35 exceeds the largest value to which it is desired to pressurize plenum chamber 34. The volume of plenum chamber 34 is substantially larger than that of cylinder 28, e.g., 30 times or more larger, so that the pressure of the gas from plenum chamber 34 remains approximately constant as the volume in cylinder 28 changes.

To sense the movement of piston 22 through cylinder 16, an elongated housing 33 having a longitudinal axis parallel to the axis of cylinder 28 is attached to the upstream end of cylinder 16. Optical sensors 36, 37, and 38 are mounted on the inside of housing 33 along its length. A rod 39 is connected between piston 22 in cylinder 16 and a flag 40 in housing 33.

Optical sensors 36, 37, and 38 each comprise a photocell and a light source aligned with the photocell to direct a light beam at the photocell. As piston 22 travels through cylinder 16, flag 40 travels through housing 33, sequentially interrupting the light beam of optical sensors 36, 37, and 38 to generate sequential electrical pulse signals. Optical sensor 36 is located at a position in housing 33 corresponding to the upstream rest position of piston 22 in cylinder 16. Optical sensor 37 is located in housing 33 at a position corresponding to the position of piston 22 in cylinder 16 at the beginning of a measuring interval, i.e., preferably far enough from the upstream position of piston 22 for piston 22 to be moving in synchronism with fluid flow through line 14. Optical sensor 38 is located in housing 33 at a position corresponding to the position of piston 22 at the end of the measuring interval near the downstream end of cylinder 16.

Sensors 36, 37, and 38 are coupled by a cable 42 to a control console 44. The output of meter 12 which could be, for example, an electrical pulse signal proportional in frequency to the flow rate, is coupled by a cable 46 to console 44. Console 44 includes electronic circuitry for determining the characteristic of flow meter 12. This could comprise a circuitry shown in FIG. 8 of U.S. Pat. No. 3,403,544 the disclosure of which is incorporated herein fully by reference. Responsive to the electrical signals generated by sensors 36 thorugh 38 and flowmeter 12, the circuitry in console 44 produces a value of flowmeter characteristic which is displayed by console 44.

The movement of control piston 30 and thus measuring piston 22 is controlled by a closed loop hydraulic, i.e., liquid, control system. An incompressible hydraulic fluid, preferably a suitable hydraulic oil, is stored in a reservoir 48. Hydraulic fluid from reservoir 48 is supplied to the inlet of a pump 50. Fluid from the outlet of pump 50 is supplied to the portion of cylinder 28 between piston 30 and the upstream end of cylinder 16, and to the inlet of a two-way hydraulic dump valve 52. Valve 52 is operated from console 44, via a cable 53. The outlet of dump valve 52 is connected through a servo control valve 54 to reservoir 48. Valve 54 is operated from console 44 via a cable 55. Pump 50 is driven by a constant speed motor 57. Pump 50 is a constant pressure, variable displacement pump that produces a slightly larger pressure than the gas in plenum chamber 34. This pressure is sufficiently large to overcome not only the gas pressure exerted on piston 30, but also the frictional forces and the force of the line fluid so as to permit piston 22 to be driven upstream. A differential pressure ($\Delta P$) transmitter 56 has a pair of inlet ports fluidically connected to the upstream end and the downstream end of cylinder 16, respectively, and an electrical output that is connected by a cable 58 to console 44. $\Delta P$ transmitter 56 produces an electrical output signal proportional to the pressure difference between the region of cylinder 16 upstream of piston 22 and the region of cylinder 16 downstream of piston 22, when openings 24 are closed by poppet valve 26 and piston 22 is traveling through cylinder 16. By utilizing gas from plenum chamber 34 on one side of control piston 30, instread of hydraulic fluid on both sides thereof, less hydraulic power is needed to accelerate measuring piston 22 rapidly to the speed of the fluid flowing through line 14. Thus, a pump having a smaller power rating can be used for pump 50 and less power is consumed.

Figure 2:
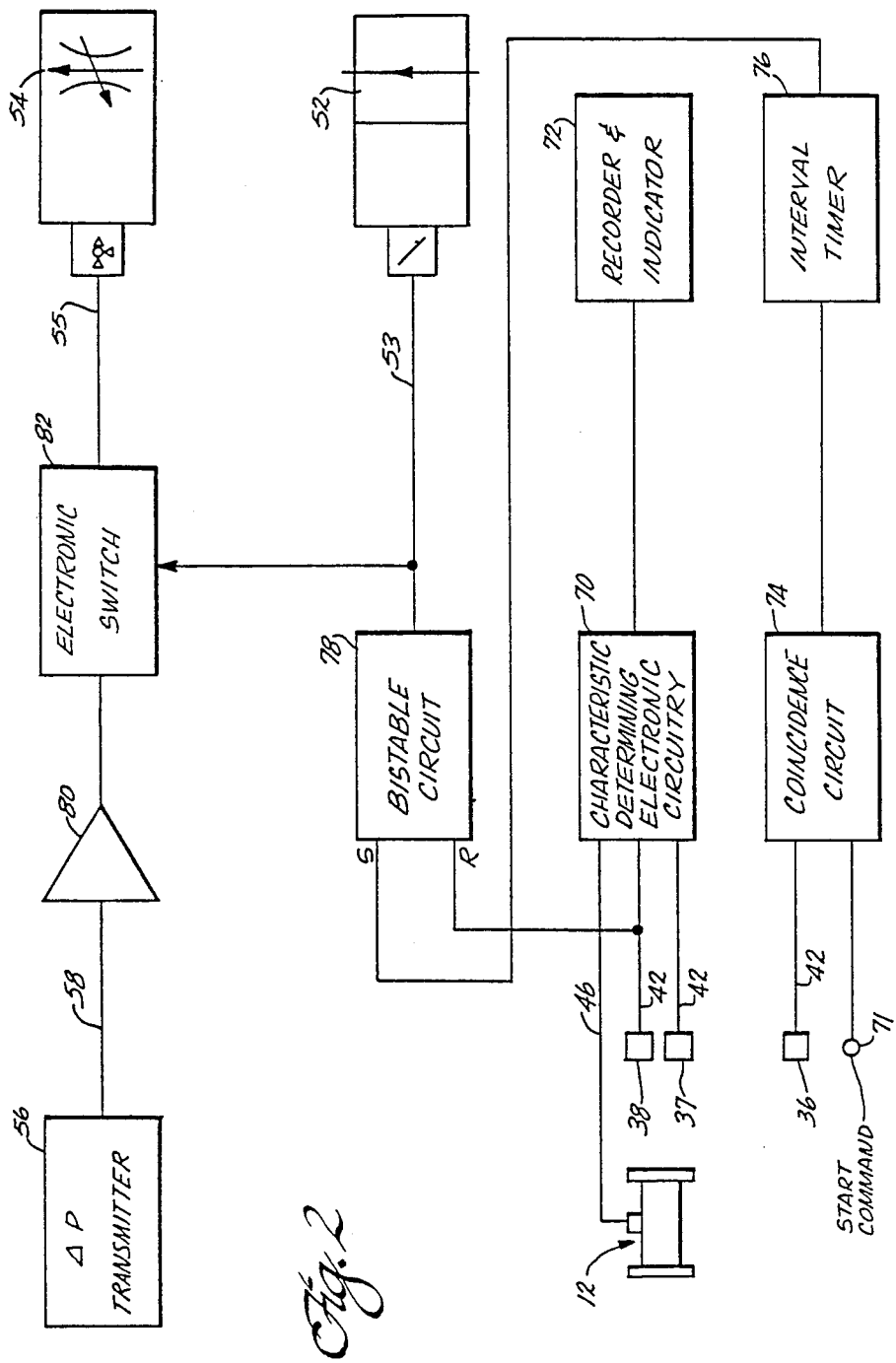
FIG. 2 is a more detailed schematic block diagram of the control console of FIG. 1 and several other selected components of the prover.

As shown in FIG. 2, control console 44 includes characteristic determining electronic circuitry 70, which could comprise the circuitry shown in FIG. 8 of U.S. Pat. No. 3,403,544. The disclosure of this patent is incorporated herein fully by reference. Cables 42 and 46 are connected to the inputs of circuitry 70 and the output of circuitry 70 is connected to a recorder and indicator 72. Responsive to the electrical pulse signals generated by sensors 37 and 38 when flag 40 interrupts their respective light beams and the electrical signal generated by flowmeter characteristic, circuitry 70 produces a value of flow meter characteristic, which is displayed by recorder and indicator 72. Cable 42 and a start command terminal are connected to the inputs of a coincidence circuit 74. The output of coincidence circuit 74 is connected to the input of an interval timer 76. The output of intervaltimer 76 is connected to a set input of a bistable circuit 78. Optical sensor 38 is connected to the reset input of bistable circuit 78. ΔP transmitter 56 is connected by cable 58 to the input of a servo amplifier 80. The output of servo amplifier 80 is coupled by an electronic switch 82 and cable 55 to the control input of servo control valve 54. The output of bistable circuit 78 is connected by cable 53 to the control input of dump valve 52 and to the switching input of electronic switch 82. When the light beam of sensor 36 is interrupted and the start command is present on terminal 71, coincidence circuit 74 triggers interval timer 76. At the end of a measured time interval, timer 76 sets bistable circuit 78. When bistable circuit 78 is set, dump valve 52 is opened and electronic switch 82 is closed thereby completing the feedback path from ΔP transmitter 56 to servo control valve 54. When the light beam of sensor 38 is interrupted, bistable circuit 78 is reset, dump valve 52 closes, and electronic switch 82 opens, thereby opening the feedback path from ΔP transmitter 56 to servo control valve 54.

In operation, prior to a test run, dump valve 52 is closed, piston 22 lies at the upstream end of cylinder 16, the light beam of sensor 36 is interrupted, electronic switch 82 is open, and poppet valve 26 is held open by the pressure of the hydraulic fluid exerted on the side of piston 30 facing toward cylinder 16. To release piston 22 for a test run, a start command is applied to terminal 71. After the timed interval, dump valve 52 opens and electronic switch 82 closes. As a result, the hydraulic pressure exertedon the side of control piston 30 facing toward cylinder 16 drops and the gas pressure on the other side of piston 30 together with the movement of fluid through line 14 causes poppet valve 26 to close openings 24, piston 22 begins to move downstream through cylinder 16, and the feedback path from ΔP transmitter 56 to servo control valve 54 becomes operative, so as to establish a constant pressure difference between the upstream and downstream sides of cylinder 16. Although the constant pressure difference could be zero, the pressure of the downstream side of piston 22 is preferably slightly larger than the pressure on the upstream side thereof. By the time piston 22 reaches a position in cylinder 16 where the light beam of sensor 37 is interrupted, piston 22 is moving in synchronism with fluid flow through line 14 and servo control valve 52 has stabilized the pressure difference between the upstream and downstream sides of piston 22, thereby minimizing perturbations in the flow rate of the fluid passing through line 14. When piston 22 reaches the downstream end of cylinder 16, stops, not shown, cushion the impact of piston 22 and open poppet valve 26, as described in U.S. Pat. No. 4,152,922. When the light beam of sensor 38 is interrupted, electronic switch 82 opens, thereby rendering the feedback path inoperative, and dump valve closes, thereby returning hydraulic pressure to the side of piston 30 facing toward cylinder 16. The hydraulic pressure exerted against piston 30 drives piston 22 with poppet valve 26 open from the downstream end of cylinder 16 to the upstream thereof. When piston 22 reaches the upstream end of cylinder 16, the cycle carrying out one test run is complete. After timer 76 times out the given interval, which is sufficient to permit any fluid disturbances to subside, the described cycle is automatically repeated until the start command is removed from terminal 71.

Instead of the circuitry described in FIG. 2, the apparatus could be operated automatically in the same fashion under the control of a microprocessor, which could also process and evaluate the test data and, if desired, perform statistical analysis thereon. Alternatively, dump valve 52 and electronic switch 82 could be actuated manually to carry out one or more test run cycles.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, the invention can be practiced without the described hydraulic control system, which is the preferred embodiment when the line fluid is compressible, i.e., a gas. But such system is not preferred when the line fluid is incompressible, i.e., a liquid. Instead of placing the dump valve and the solenoid control valve in series, as shown, they could be placed in parallel. Rather than being axially aligned, the control and measuring cylinders could be placed side by side, in which case the rod would have a U-shape and the pressurized gas from the plenum chamber would act on the side of the control piston to which the rod is connected. Alternatively, the control cylinder could be axially aligned with the downstream end of the measuring cylinder.

What is claimed is:

1. Apparatus for proving a flowmeter in an operating fluid line through which fluid at a given static pressure flows, the apparatus comprising:
   a fluid displacement measuring cylinder having near its ends, respectively, an inlet and an outlet connected in the fluid line;
   a fluid displacement measuring piston adapted to travel through the measuring cylinder;
   valve means in the fluid line for bypassing the measuring piston when open;
   a control cylinder;
   a movable rod having one end lying within the control cylinder and the other end connected to the side of the measuring piston facing toward one end of the measuring cylinder;
   means for closing the valve means to drive the measuring piston through the measuring cylinder as a fluid barrier in synchronism with fluid flow through the fluid line in a test run from an upstream position to a downstream position;
   means for sensing the movement of the measuring piston through the measuring cylinder during the test run;
   means during the entire test run from the upstream position to the downstream position for exerting an approximately constant force on the one end of the rod; and means for adjusting the approximately constant force to accommodate changes in static pressure from test run to test run.

2. The apparatus of claim 1, in which the exerting means comprises a gas pressurized plenum chamber and connecting means that connects the plenum chamber to the control cylinder so the force of the gas pressure is exerted on the one end of the rod.

3. The apparatus of claim 2, in which the adjusting means comprises a venting valve at the plenum chamber.

4. The apparatus of claim 3, in which the adjusting means additionally comprises a source of high pressure gas and a control valve for connecting the source to the plenum chamber.

5. The apparatus of claim 4, in which the adjusting means additionally comprises a pressure gauge on the plenum chamber.

6. The apparatus of claim 4, in which the control valve is manual.

7. The apparatus of claim 1, additionally comprising a control piston adapted to travel through the control cylinder as a fluid barrier, one side of the control piston being connected to the one end of the rod; a source of hydraulic fluid at a sufficiently high pressure to create a greater force than the constant force when applied to the one side of the control piston; and means for alternatively applying and removing the hydraulic fluid from the source to and from the one side of the control piston.

8. The apparatus of claim 7, in which the exerting means comprises a gas pressurized plenum chamber having a substantially larger volume than the control cylinder and means for connecting the plenum chamber to the control cylinder so the force of the gas pressure is exerted on the one end of the rod.

9. The apparatus of claim 1, in which the measuring piston has a passage for fluid flow through the measuring cylinder and means for opening and closing the passage.

10. The apparatus of claim 9, in which the opening and closing means comprises as part of the measuring piston a poppet valve between the inlet and the passage, the poppet valve being moveable toward and away from the passage to close and open the passage respectively, the rod being connected to the side of the poppet valve facing toward the one end of the measuring cylinder.

11. The apparatus of claim 1, in which the rod creates a force imbalance on the measuring piston in the presence of the fluid in the measuring cylinder, and the exerting means exerts an approximately constant force on the one end of the control piston equal and opposite to the force imbalance on the measuring piston caused by the rod.

12. The apparatus of claim 1, in which the rod creates a force imbalance on the measuring piston in the presence of the fluid in the measuring cylinder and the measuring cylinder exerts a dynamic frictional force on the measuring piston as it travels through the measuring cylinder, and the exerting means exerts an approximately constant force on the one end of the rod equal and opposite to the force imbalance on the measuring piston caused by the rod and the dynamic frictional force.

13. The apparatus of claim 1, in which the rod creates a force imbalance on the measuring piston in the presence of the fluid in the measuring cylinder and the exerting means comprises means for exerting an approximately constant force on the one end of the rod sufficiently large to overcome the force imbalance on the measuring piston caused by the rod.

14. The apparatus of claim 13, in which the exerting means comprises a gas pressurized plenum chamber having a gas volume substantially larger than the volume of the control cylinder and means for connecting the plenum chamber to the control cylinder so the force of gas pressure on the one end of the rod urges the measuring piston toward the other end of the measuring cylinder.

15. The apparatus of claim 14, in which the volume of the plenum chamber is of the order of thirty times the volume of the control cylinder.

16. The apparatus of claim 7, in which the source of hydraulic fluid comprises a hydraulic fluid reservoir, a continuously operating pump having an inlet connected to the reservoir and an outlet, the pump producing at its outlet hydraulic fluid pressure greater than the gas pressure in the plenum chamber, a dump valve having an outlet connected to the reservoir and an inlet connected to the outlet of the pump, and means for connecting the outlet of the pump to the control cylinder.

17. The apparatus of claim 16, additionally comprising means for opening the dump valve to reduce the hydraulic fluid pressure in the control cylinder and to close the dump valve to increase the hydraulic fluid pressure in the control cylinder.

18. The apparatus of claim 1, in which the rod creates a force imbalance on the measuring piston in the presence of the fluid in the measuring cylinder, the measuring cylinder exerts a dynamic frictional force on the measuring piston as it travels through the measuring cylinder, and the exerting means comprises means for exerting an approximately constant force on the one end of the rod sufficiently large to overcome the force imbalance on the measuring piston caused by the rod and the dynamic frictional force.

19. Apparatus for proving a flowmeter in an operating fluid line through which fluid at a given static pressure flows, the apparatus comprising:
a fluid displacement measuring cylinder having near its ends, respectively, an inlet and an outlet through which the fluid in the line flows;
a fluid displacement measuring piston adapted to travel through the measuring cylinder between its ends, a dynamic frictional force being exerted by the line fluid on the measuring piston as it travels through the measuring cylinder;
valve means for carrying line fluid from one side of the measuring piston to the other when open;
means for closing the valve means and releasing the measuring piston to travel downstream as a fluid barrier through the measuring cylinder in synchronism with fluid flow therethrough;
means for sensing the movement of the measuring piston through the measuring cylinder;
means for exerting an approximately constant downstream force acting on the measuring piston during its entire path of travel downstream; and
means for adjusting the approximately constant force to accommodate changes in static pressure in the line.

20. The apparatus of claim 19, in which the exerting means comprises a control cylinder; a control piston adapted to travel through the control cylinder; a rod connecting the control piston only to the side of the measuring piston facing toward one end of the measuring cylinder thereby creating a force imbalance on the measuring piston in the presence of the fluid in the measuring cylinder;

a gas pressurized plenum chamber, and means for connecting the plenum chamber to the control cylinder so the force of the gas pressure on one side of the control piston urges the measuring piston toward the other end of the measuring cylinder.

21. Apparatus for proving a flowmeter in an operating fluid line through which fluid flows comprising:

a fluid displacement measuring cylinder having near its ends, respectively, an inlet and an outlet connected in the fluid line;

a fluid displacement measuring piston adapted to travel through the measuring cylinder;

a control cylinder having a given volume;

a control piston adapted to travel through the control cylinder;

a rod connecting the control piston to the side of the measuring piston facing toward one end of the measuring cylinder;

means for sensing the movement of the measuring piston through the measuring cylinder;

valve means for directing line fluid from one side of the measuring piston to the other when open;

means for closing the valve means to drive the measuring piston through the measuring cylinder as a fluid barrier from the inlet to the outlet in synchronism with fluid flow through the line in a test run;

a gas pressurized plenum chamber having a gas volume substantially larger than the given volume; and means for connecting the plenum chamber to the control cylinder so the force of the gas pressure on one side of the control piston urges the measuring piston toward the other end of the measuring cylinder while the gas pressure on the one side of the control piston remains approximately constant as the volume thereof changes.

22. A method for operating a flowmeter prover comprising a fluid displacement measuring cylinder having near its ends, respectively, an inlet and an outlet through which the fluid flows, a fluid displacement measuring piston adapted to travel through the measuring cylinder between its ends as a fluid barrier, a control cylinder, a control piston adapted to travel through the control cylinder, a rod connecting the control piston only to the side of the measuring piston facing toward one end of the measuring cylinder, thereby creating a force imbalance on the measuring piston in the presence of a fluid under pressure in the measuring cylinder, means for sensing the movement of the measuring piston through the measuring cylinder, and means for exerting an approximately constant downstream acting force on the measuring piston during its path of travel downstream, the method comprising the steps of:

placing the prover in a fluid line in series with a flowmeter under test in such a manner as to permit the fluid in the line to bypass the measuring piston when stationary;

releasing the measuring piston to travel downstream through the measuring cylinder in synchronism with fluid flow therethrough;

comparing the response of the flowmeter while the measuring piston is stationary with the response while the measuring piston is moving downstream; and adjusting the force exerted by the exerting means until the two responses are the same.

23. A method for operating a flowmeter prover comprising a fluid displacement measuring cylinder having near its ends, respectively, an inlet and an outlet through which the fluid flows, a fluid displacement measuring piston adapted to travel through the measuring cylinder between its ends as a fluid barrier, a control cylinder, a control piston adapted to travel through the control cylinder, a rod connecting the control piston only to the side of the measuring piston facing toward one end of the measuring cylinder thereby creating a force imbalance on the measuring piston in the presence of a fluid under pressure in the measuring cylinder, means for sensing the movement of the measuring piston through the measuring cylinder, and means for exerting an approximately constant downstream acting force on the measuring piston during its path of travel downstream, the method comprising the steps of:

placing the prover in a fluid line in such a manner as to permit the fluid in the line to bypass the measuring piston when stationary;

measuring the static pressure of the fluid in the line while the measuring piston is stationary;

adjusting the force exerted by the exerting means to compensate for changes in the measured static pressure; and releasing the measuring piston to travel downstream through the measuring cylinder in synchronism with fluid flow therethrough.

24. Apparatus for determining the characteristic of a flowmeter comprising:

a fluid displacement measuring cylinder having near its ends, respectively, an inlet and an outlet connecting in the fluid line;

a fluid displacement measuring piston adapted to travel through the measuring cylinder in synchronism with fluid flow therethrough;

a control cylinder having a given volume;

a control piston adapted to travel through the control cylinder;

a rod connecting the control piston to the measuring piston;

means for sensing the movement of the measuring piston through the measuring cylinder;

a gas pressurized plenum chamber having a gas volume substantially larger than the given volume; and means for connecting the plenum chamber to the control cylinder so the force of the gas pressure on one side of the control piston urges the measuring piston toward one end of the measuring cylinder while the gas pressure on the one side of the control piston remains approximately constant as the volume thereof changes.

25. The apparatus of claim 24, in which the volume of the plenum chamber is of the order of thirty times the volume of the control cylinder.

26. The apparatus of claim 24, in which the control piston is adapted to travel through the control cylinder as a fluid barrier, the apparatus additionally comprising:

a source of hydraulic fluid at a sufficiently high pressure to create a greater force that the constant force when applied to the other side of the control piston; and means for alternatively applying and removing the hydraulic fluid from the source to and from the other side of the control piston.

27. The apparatus of claim 26, in which the source of hydraulic fluid comprises:
a hydraulic fluid reservoir;
a continuously operating pump having an inlet connected to the reservoir and an outlet, the pump producing at its outlet hydraulic fluid pressure greater than the gas pressure in the plenum chamber;
a dump valve having an outlet connected to the reservoir and an inlet connected to the outlet of the pump; and
means for connecting the outlet of the pump to the control cylinder.

28. The apparatus of claim 27, additionally comprising means for opening the dump valve to reduce the hydraulic fluid pressure in the control cylinder and to close the dump valve to increase the hydraulic fluid pressure in the control cylinder.

29. The apparatus of claim 27, additionally comprising:
means for sensing the pressure difference on opposite sides of the measuring piston; and
means responsive to the sensing means for controlling the pressure of the liquid applied to the control cylinder to maintain the pressure difference constant.

30. The apparatus of claim 27, additionally comprising:
pressure sensing means in the measuring cylinder;
means responsive to the pressure sensing means for controlling the pressure of the liquid applied to the control cylinder to maintain a pressure condition constant.

31. Apparatus for determining the characteristic of a flowmeter comprising:
a fluid displacement measuring cylinder having near its ends, respectively, an inlet and an outlet connected in the fluid line;
a fluid displacement measuring piston adapted to travel through the measuring cylinder;
a control cylinder;
a control piston adapted to travel through the control cylinder as a fluid barrier;
a rod connecting the control piston to the side of the measuring piston facing toward one end of the measuring cylinder;
means for sensing the movement of the measuring piston through the measuring cylinder;
a gas pressurized plenum chamber;
means for connecting the plenum chamber to the control cylinder so the force of the gas pressure on one side of the control piston urges the measuring piston toward the other end of the measuring cylinder;
a source of liquid under pressure connected to the control cylinder so the force of the liquid pressure on the other side of the control piston urges the measuring piston toward the opposite end of the measuring cylinder; and
means for controlling the pressure of the liquid from the source applied to the control cylinder.

32. The apparatus of claim 31, in which the rod is connected to the side of the control piston against which the liquid acts and the gas acts against the other side of the control piston.

33. Apparatus for proving a flowmeter in an operating fluid line through which fluid flows, the apparatus comprising a fluid displacement measuring cylinder having near its ends, respectively, an inlet and an outlet connected in the fluid line;
a fluid displacement measuring piston adapted to travel through the measuring cylinder in synchronism with fluid flow;
valve means in the fluid line for bypassing the measuring piston when open;
a control cylinder;
a control piston adapted to travel through the control cylinder;
a rod connecting the control piston to the measuring piston;
means for sensing the movement of the measuring piston through the measuring cylinder;
means for closing the valve means to drive the measuring piston through the measuring cylinder in synchronism with fluid flow through the fluid line in a test run from an upstream position to a downstream position;
a liquid source under pressure;
means for applying liquid from the source to the control cylinder so the force of the liquid pressure acts on the control piston;
means for sensing the pressure difference on opposite sides of the measuring piston; and
means responsive to the sensing means for controlling the pressure of the liquid applied to the control cylinder to maintain the pressure difference constant, and in which the control piston is adapted to travel through the control cylinder as a fluid barrier, the liquid pressure acting on one side of the control piston, the apparatus additionally comprising:
a gas pressurized plenum chamber; and
means for connecting the plenum chamber to the control cylinder to exert gas pressure on the other side of the control piston.

34. Apparatus for proving a flowmeter in an operating fluid line through which fluid flows, the apparatus comprising:
a fluid displacement measuring cylinder having near its ends, respectively, an inlet and an outlet connected in the fluid line;
a fluid displacement measuring piston adapted to travel through the measuring cylinder in synchronism with fluid flow;
valve means in the fluid line for bypassing the measuring piston when open;
a control cylinder;
a control piston adapted to travel through the control cylinder;
a rod connecting the control piston to the measuring piston;
means for sensing the movement of the measuring piston through the measuring cylinder;
means for closing the valve means to drive the measuring piston through the measuring cylinder in synchronism with the fluid flow through the fluid line in a test run from an upstream position to a downstream position;
a liquid source under pressure;
means for applying liquid from the source to the control cylinder so the force of the liquid pressure acts on the control piston;
pressure sensing means disposed between the measuring piston and the flowmeter; and means responsive to the sensing means for controlling the pressure of the liquid applied to the control cylinder to maintain a pressure condition constant, and in which the control piston is adapted to travel through the control cylinder as a fluid barrier, the liquid pressure acting on one side of the control piston, the apparatus additionally comprising:

a gas pressurized plenum chamber; and means for connecting the plenum chamber to the control cylinder to exert gas pressure on the other side of the control piston.

* * * * *